US011028917B1

United States Patent
Chapman et al.

(10) Patent No.: US 11,028,917 B1
(45) Date of Patent: Jun. 8, 2021

(54) WORK EQUIPMENT TRANSMISSION WITH GEAR BAFFLE AND METHOD OF ASSEMBLY

(71) Applicant: Deere & Company, Moline, IL (US)

(72) Inventors: Marc David Chapman, Coffeyville, KS (US); Michael J. Cliff, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/787,295

(22) Filed: Feb. 11, 2020

(51) Int. Cl.
*F16H 57/04* (2010.01)
*F16H 1/06* (2006.01)
*F16H 57/023* (2012.01)
*E02F 9/20* (2006.01)
*F16H 57/02* (2012.01)

(52) U.S. Cl.
CPC ......... *F16H 57/0495* (2013.01); *E02F 9/202* (2013.01); *F16H 1/06* (2013.01); *F16H 57/023* (2013.01); *F16H 57/0423* (2013.01); *F16H 57/0452* (2013.01); *F16H 57/0457* (2013.01); *F16H 2057/02056* (2013.01)

(58) Field of Classification Search
CPC .... F16H 57/0495; F16H 57/0423; F16H 1/06; F16H 57/023; F16H 57/0452; F16H 57/0409; F16H 57/0457; F16H 2057/02056; E02F 9/202
See application file for complete search history.

(56) References Cited

U.S. PATENT DOCUMENTS

| 8,122,787 B2 | 2/2012 | Simpson et al. | |
| 2006/0060424 A1* | 3/2006 | Tominaga | F16H 57/0423 184/11.1 |
| 2006/0179973 A1* | 8/2006 | Matsufuji | F16H 57/0447 74/606 R |

FOREIGN PATENT DOCUMENTS

EP 3309429 A1 * 4/2018 ......... F16H 57/0423

OTHER PUBLICATIONS

Basic Power Industries, Inc., Baffle Oil Transmission Late Model Part No. BOR1017-036-002, https://bpi.ebasicpower.com, copyright 1999-2020.
John Deere, Funk DF150 Powershift Transmission Industrial Drivetrain Transmission Specifications Brochure, Jan. 2017.
John Deere, Funk DF250 Powershift Transmission Industrial Drivetrain Transmission Specifications Brochure, Jan. 2017.
(Continued)

Primary Examiner — Thomas C Diaz
(74) Attorney, Agent, or Firm — Klintworth & Rozenblat IP LLP

(57) ABSTRACT

A work equipment transmission includes a gear, a gearbox, and a baffle. The gearbox housing contains the gear within an internal cavity that defines a sump and is defined by a first housing body having a first baffle-retaining surface and an outlet opening and a second housing body having a second baffle-retaining surface. The baffle has a shroud wall defining a peripheral lip for engagement with the first baffle-retaining surface, an annular collar having an annular collar lip for engagement with the second baffle-retaining surface, and an end wall. The baffle is mounted within the gearbox housing, the end wall extending proximate the gear and the shroud wall extending at least partially around the gear. The baffle is mounted by a clamping force between the first housing body and the second housing body.

20 Claims, 5 Drawing Sheets

(56) References Cited

OTHER PUBLICATIONS

ZF Friedrichshafen AG, Stepless Into the Future—ZF cPower—CVT Technology Brochure, undated, admitted prior art.
Deere & Company, pending U.S. Appl. No. 16/545,100, filed Aug. 20, 2019.

* cited by examiner

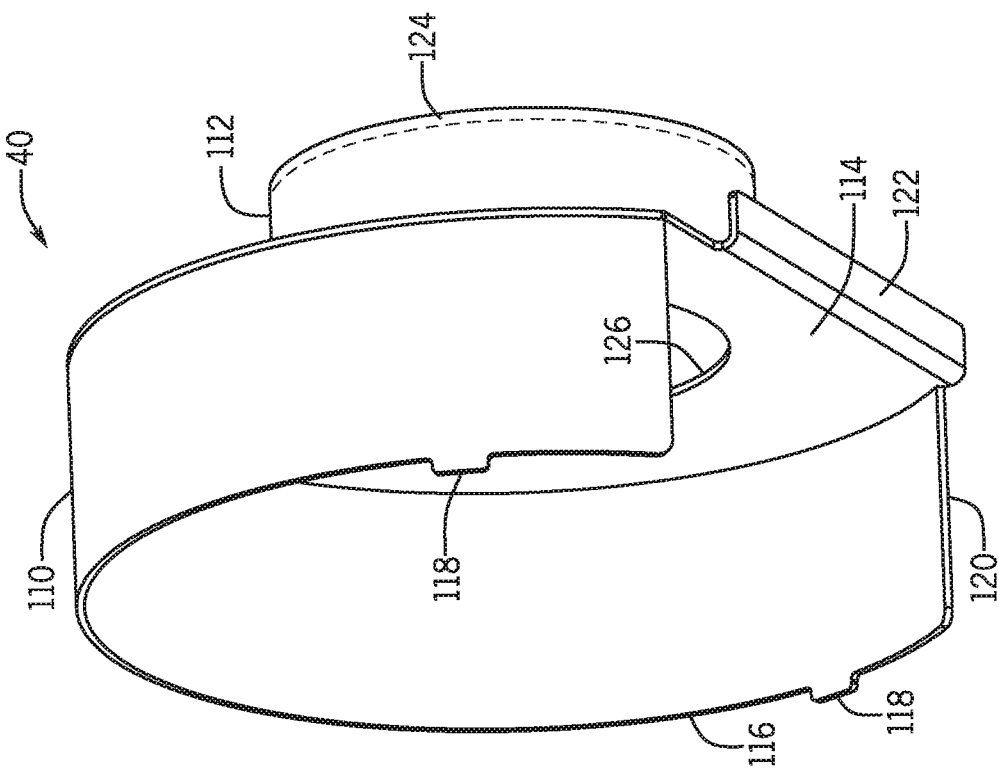
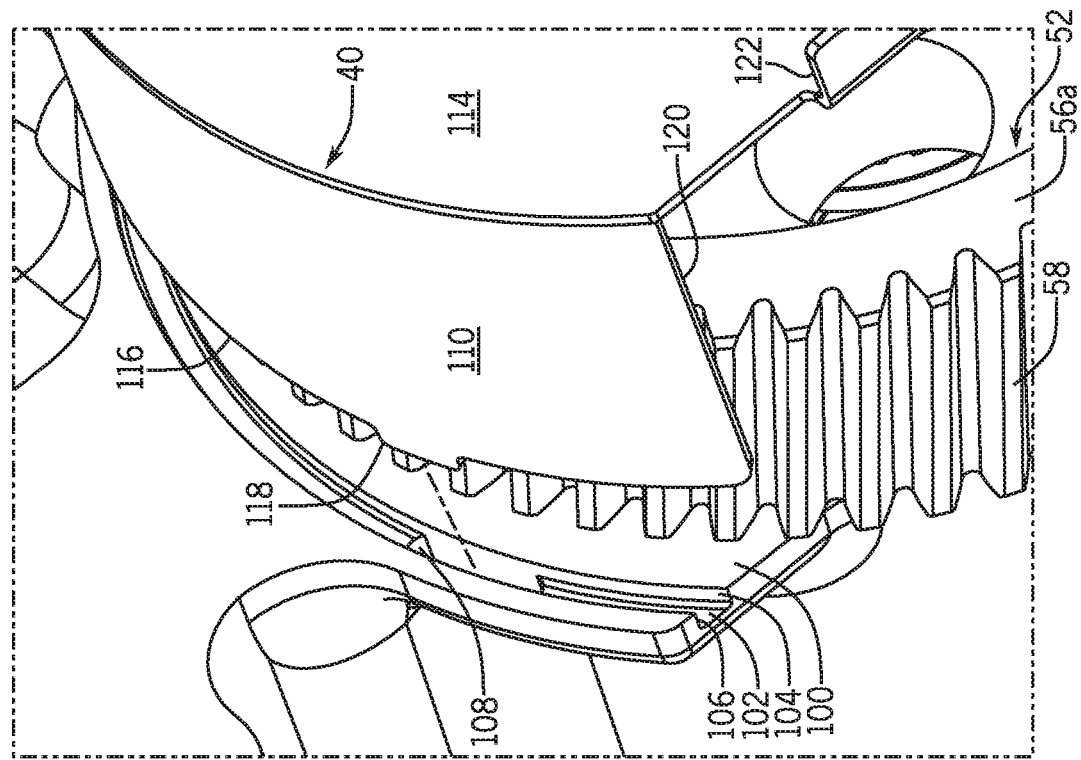

WORK EQUIPMENT TRANSMISSION WITH GEAR BAFFLE AND METHOD OF ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to gear baffles for usage within work equipment.

BACKGROUND OF THE DISCLOSURE

The transmissions of wheel loaders and other work equipment often include actively lubricated gear trains installed within gearbox housings. To limit gear windage and lubrication losses in the transmission gearbox, a baffle may be disposed around one or more of the gears within the gearbox housing. The baffle also helps maintain proper spacing between the enclosed gear(s), shaft, and neighboring components within the transmission as may be particularly useful in the context of work equipment.

SUMMARY OF THE DISCLOSURE

A work equipment (e.g., vehicle) transmission is provided. In various embodiments, the work equipment transmission includes a gear, a gearbox housing containing the gear within an internal cavity that defines a sump retaining a volume of lubricant, and a baffle. The gearbox housing is defined by a first housing body having a first baffle-retaining surface and an outlet opening disposed about the gear axis; and a second housing body mountable to the first housing body and having a second baffle-retaining surface. The baffle has a shroud wall defining a peripheral lip, an annular collar having an annular collar lip, the annular collar having an opening concentric with the annular collar lip, and an end wall extending radially and uniting the shroud wall and the annular collar. The baffle is disposed within the gearbox housing to separate the gear from the volume of lubricant in the sump, the end wall extending proximate the face of the gear and the shroud wall extending at least partially around the outer periphery of the gear. The baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

In another aspect, a method of assembling a work equipment transmission with a baffle is provided. The method includes providing a first housing body having a first baffle-retaining surface and an outlet opening, mounting a gear in the first housing body, installing a baffle on the gear, mounting a second housing body to the first housing body, and mating the first housing body with the second housing body to form a gearbox housing containing the gear within an internal cavity that defines sump retaining a volume of lubricant. The gear has a face and an outer periphery and is rotatable about a gear axis defined by the outlet opening. The baffle has a shroud wall defining a peripheral lip, an annular collar having an opening concentric with the annular collar lip, and an end wall extending radially and uniting the shroud wall and the annular collar. The second housing body has a second baffle-retaining surface. The baffle is disposed within the gearbox housing to separate the gear from the volume of lubricant in the sump, the end wall extending proximate the face of the gear and the shroud wall extending at least partially around the outer periphery of the gear. The baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 5 is an exploded isometric view of a portion of the transmission gearbox and baffle of FIG. 2; and FIG. 6 is an isometric view of the baffle of FIG. 2.

Figure 1:
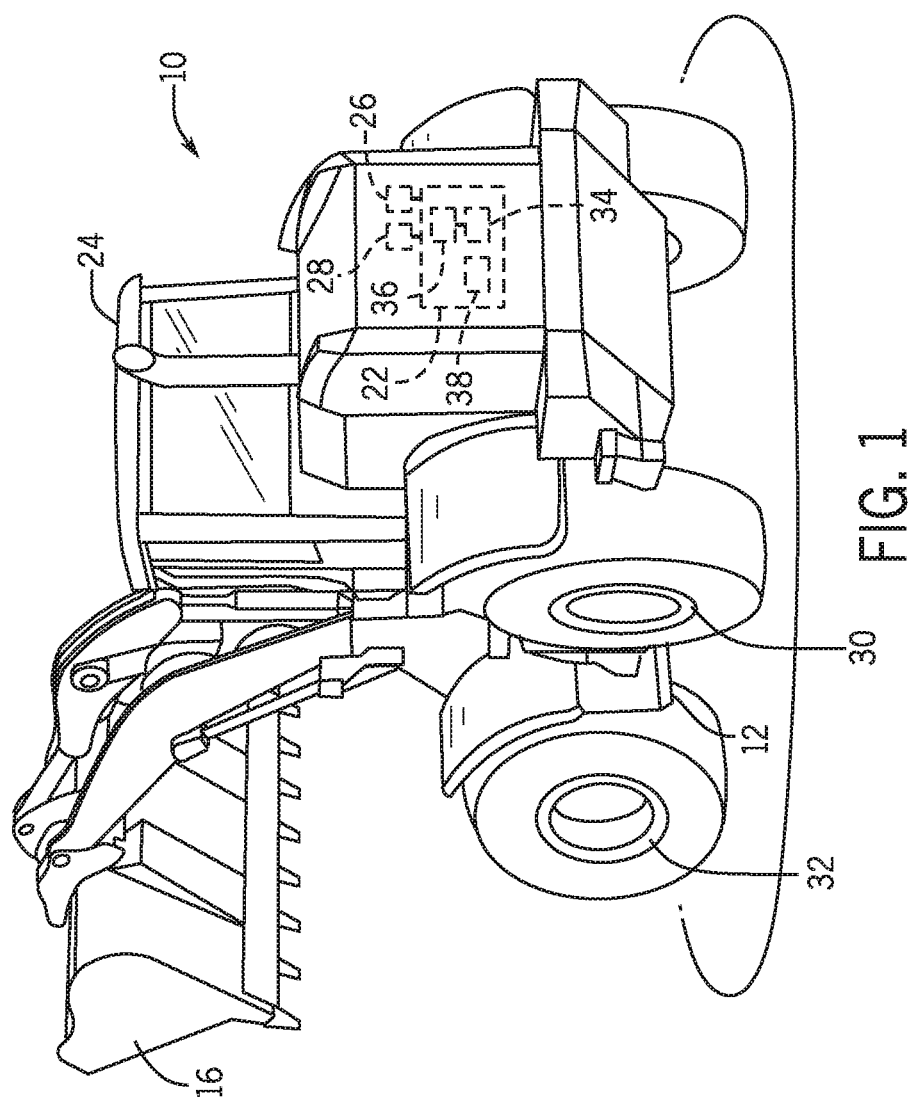
FIG. 1 is a perspective view of an example work equipment (wheel loader) containing a transmission into which embodiments of the baffle are incorporated, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

Transmissions for work equipment (e.g., work vehicles) may have multi-gear gearboxes that contain a volume of lubricant. The transmission may include shafts (e.g., input shaft and output shaft) that extend through the transmission housing to an external area to mate with external components, which introduces a possible leak point for the lubricant. Such transmissions and baffles are associated with various limitations. The gears are susceptible to windage power losses due to drag on gear teeth, particularly at high speeds. The transmissions may experience extreme external work conditions such as bouncing and shock loads. Internal components also may experience these external conditions as well as high heat and vibration during operation of the transmission, which may cause misalignment or other damage. Internal components may be mounted with fasteners, which may be susceptible to leakage while also increasing the overall part count, cost, and complexity of the work equipment transmission.

An ongoing demand thus exists for the provision of work equipment (e.g., vehicle) transmission gearboxes having high efficiency, lubricant retention, reduced part counts, ease of assembly, decreased manufacturing costs, and other desirable characteristics. In satisfaction of this demand, work equipment transmission gearboxes having such desirable characteristics are provided herein and realized, at least in part, through the incorporation of one or more baffles into the gearbox housing of the transmission gearbox. As described below, embodiments of the baffle function to optimize transmission lubrication, maintain critical part spacing, and enhance other operational aspects of the transmission gearbox (e.g., reduce windage). The baffle and gearbox housing may further include certain complementary mounting arrangements, such as grooves, slots, and tabs, which may be engaged with a clamping force (e.g., a press fit), to provide a robust seal and ensure proper registration of the baffle into the gearbox housing, while negating or reducing reliance on fasteners. The mounting arrangement of the baffle may also provide an anti-rotation feature deterring undesired rotation of the baffle within the transmission in at least some embodiments.

The disclosed baffle may include a circumferential shroud wall extending at least partially around the outer periphery and gear teeth of the gear or gears about which the baffle is positioned. The shroud wall is generally tubular and dimensioned to provide a relatively tight (low clearance) fit around the enclosed gear(s) and gear teeth such that pooling of lubricant within the shroud interior is minimized to reduce windage and improve the overall performance of the work equipment transmission. The shroud wall may also protect the enclosed gear(s) from debris and prevent misalignment.

Additionally, the disclosed baffle may include an annular collar that is also tubular, with a reduced diameter relative to the shroud wall, to fit around and protect additional components of the gear(s) or the assembly supporting the gear(s), such as a shaft and bearings. A disc-like end wall extends radially to connect the shroud wall and the annular collar. Like the shroud wall, the annular collar and the end wall are dimensioned to closely fit and enclose components the gear(s). Additional features may be incorporated into the annular collar and/or the end wall to strengthen the baffle and improve mounting. In some examples, an annular collar lip is welded onto the annular collar at a terminal end where the annular collar engages an inner boss of the gearbox housing.

In one or more embodiments, the disclosed baffle includes one or more gear-mesh windows formed in the shroud wall. The gear-mesh window is dimensioned to allow the enclosed gear(s) to engage and mesh with other gears of the work equipment transmission. In certain embodiments, the disclosed baffle may provide a gear-mesh window in the annular collar as an alternative location or in addition to the shroud wall. Due to the arrangement of the gearbox transmission during use, the gear-mesh window is positioned such that the baffle still protects and encloses the rest of the gear(s) in the manner discussed herein. To provide additional strength and stability in the area of the gear-mesh window, a stiffening rib may extend from the end wall.

The disclosed baffle may provide advantageous mounting and assembly within the work equipment transmission. Fasteners that may be used with conventional baffles may introduce potential leak points or failure points for the gearbox housing or the baffle. The disclosed baffle eliminates the need for such fasteners by being retained by a clamping force from the gearbox housing, for example, being compressed into mounting structures of the gearbox housing. To accomplish this, the baffle and the inner bosses may have various complementary mounting features, for example, the inner bosses have baffle-retaining surfaces, one or more of which may be an annular groove that is sized to receive a lip of the shroud wall or the annular collar. Additionally, the baffle-retaining surfaces may include one or more additional anti-rotation features such as slots for receiving complementary retention tabs of the baffle, which prevent rotation of the baffle relative to the gearbox housing.

In certain embodiments, the entire baffle or various features of the baffle may be integrally formed as features or portions of a single or unitary piece including, but not limited to, any combination of the above-mentioned shroud wall, end wall, annular collar, stiffening rib, and retention tabs. This arrangement provides the baffle with a structurally robust construction at a reduced manufacturing cost. The unitary construction of the baffle along with the aforementioned fastener-free mounting advantageously reduces parts and assembly time, thereby significantly reducing manufacturing costs. The baffle also provides suitable strength and rigidity to accommodate extreme operating conditions internal to the gearbox transmission (e.g., high heat, rotational speed, vibrations, etc.) along with conditions external to the gearbox (shock loads, etc.). Embodiments of the baffle may provide other benefits, as well. An example embodiment of the baffle and a work equipment transmission suitably containing the baffle is described in conjunction with FIGS. 1-6.

Example Embodiments of a Work Equipment Transmission with Gear Baffle and Method of Assembly Referring to FIG. 1, in some embodiments, the disclosed work vehicle 10 may be a wheel loader, although, as noted, the work equipment transmission and baffle described herein may be applicable to a variety of work equipment machines, such as other construction vehicles (e.g., motor graders), agricultural vehicles including tractors, and forestry vehicles (e.g., forwarders). As shown, the work vehicle 10 may be considered to include a chassis constituted by a chassis 12 supporting a work implement 16. The work implement 16 is selectively positioned by various combinations of structural elements (e.g., arms, crossbars, pivot joints, etc.) and controllably moved utilizing any number of actuators, such as hydraulic cylinders. The work vehicle 10 may further be considered to include a power train 22, an operator cabin 24, a control system 26, and a hydraulic system 28. The work vehicle 10 may be supported off the ground by ground-engaging wheels or tracks. In the illustrated example, the work vehicle 10 includes a front axle (not shown) mounting steerable front wheels 30 (one at each left/right lateral side of the work vehicle 10) and a rear axle (not shown) mounting driven rear wheels 32 (one or more at each left/right side of the work vehicle 10).

Generally, the power train 22 includes a source of propulsion, such as an engine 34, which supplies power to the work vehicle 10, as either direct mechanical power or after being converted to electric power (e.g., via batteries) or hydraulic power. In one example, the engine 34 is an internal combustion engine, such as a diesel engine, that is controlled by an engine control module (not shown) of the control system 26. It should be noted that the use of an internal combustion engine is merely an example, as the source of propulsion may be a fuel cell, an electric motor, a hybrid-gas electric motor, or other power-producing devices. The engine 34 selectively drives the wheels or tracks of the work vehicle 10, for example the rear wheels 32 or both the front and rear wheels 30, 32. Additionally, the power train 22 has wheel steering components 36, including various devices (e.g., power steering pumps and lines, steering mechanisms, and the like) that couple manual (e.g., operator steering controls or wheel) and/or automated (via the control system 26) steering input to one or more of the sets of wheels, such as the front wheels 30.

The power train 22 of the work vehicle 10 further includes at least one actively lubricated transmission 38. For example, the transmission 38 may be mounted on the rear frame 12 of the work vehicle 10 at a location behind the operator cabin 24. During operation, the work equipment transmission 38 transmits rotary motion from the engine 34 of the work vehicle 10 to other driven components (e.g., the rear wheels 32) of the work vehicle 10, while providing a desired mechanical reduction between the engine output and the driven components. To help ensure the proper operation of the work equipment transmission 38 over extended periods of time, the transmission 38 is actively lubricated through the circulation of a selected lubricant, typically oil, which may be filtered and otherwise conditioned (e.g., cooled) to maintain lubricant quality. To further ensure proper operation of the transmission 38 despite the relatively harsh, high vibratory environment in which the work vehicle 10 and the transmission 38 may operate, the transmission 38 may also contain one or more baffles, which help maintain proper spacing between static and rotational components of the transmission 38. In accordance with embodiments of the present disclosure, the work equipment transmission 38 of the work vehicle 10 contains at least one baffle 40, which not only provides such a part-spacing function, but which further provides other functions (e.g., lubricant containment), as discussed more fully below in connection with FIGS. 2-6.

Figure 2:
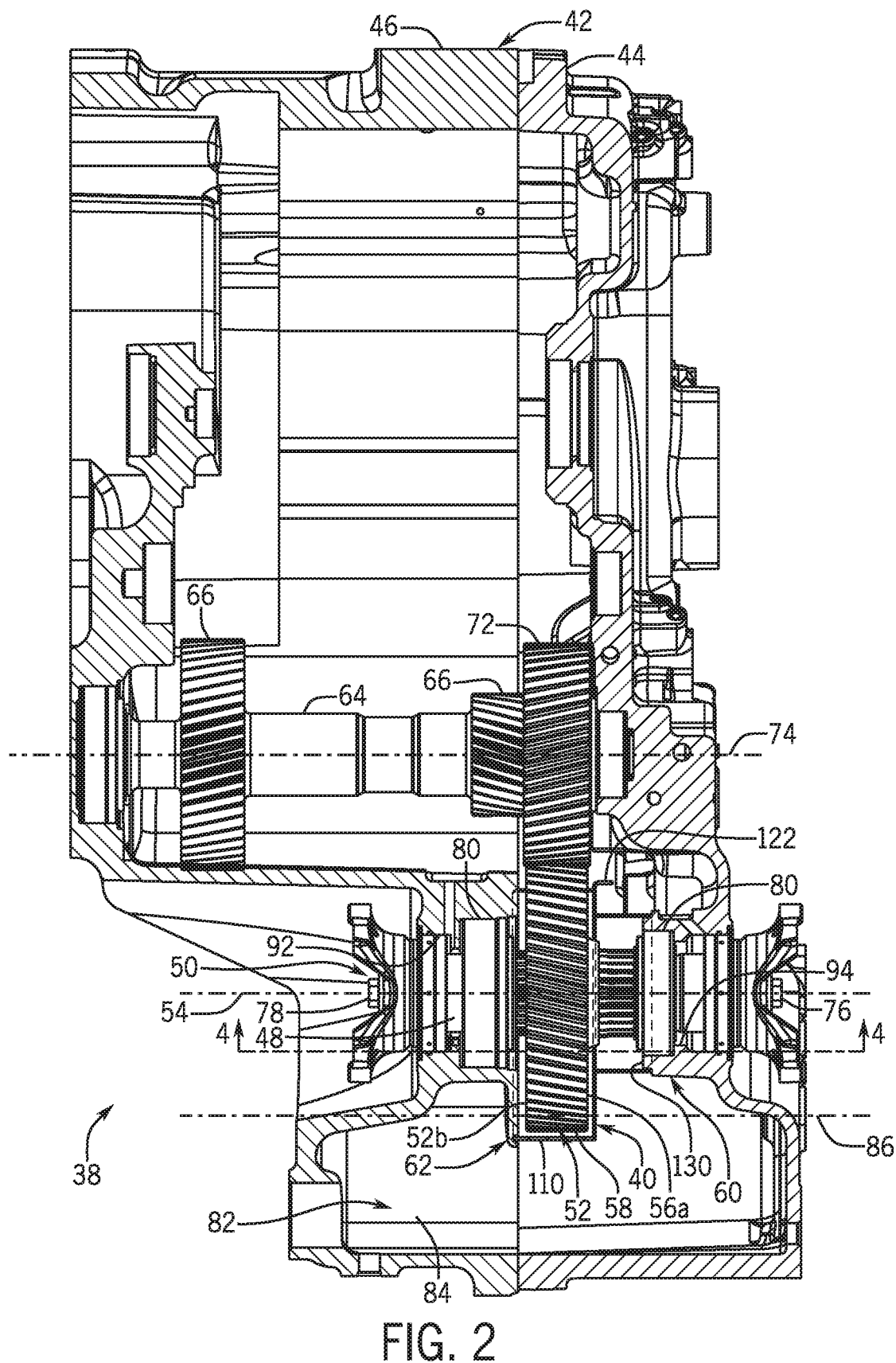
FIG. 2 is a cross-sectional side view of a transmission gearbox containing an example baffle.

Referring also to FIG. 2, an example transmission 38 is shown and is applicable to the work vehicle 10 being a wheel loader as discussed above, as well as various alternative work equipment applications (e.g., motor grader construction work vehicles). The transmission 38 includes a gearbox housing 42 defined by a first housing body 44 (illustrated as a forward housing body) and a second housing body 46 (illustrated as a rear housing body). The terms "forward" and "rear," as appearing herein, are defined with respect to the work equipment in which the gearbox housing 42 is incorporated. Generally, the gearbox housing 42 contains various gears, shafts, bearings, and other such components arranged to provide gear reduction from an input to an output. During assembly, the various components contained within the gearbox housing 42 may be initially installed within the first housing body 44. The second housing body 46 may then be brought together with the first housing body 44. Finally, the first and second housing bodies 44, 46 may be joined together utilizing, for example, bolts or other fasteners.

Figure 3:
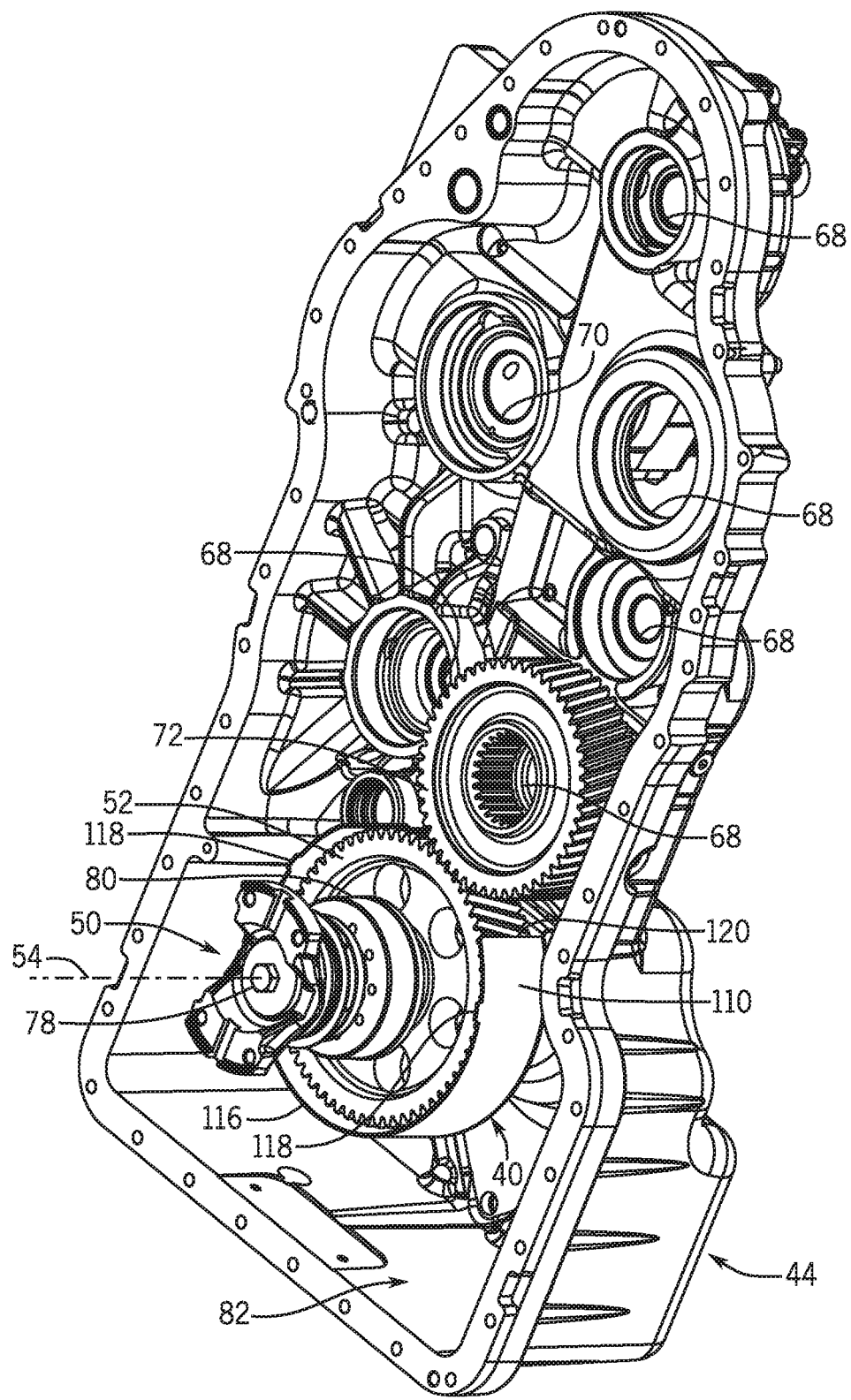
FIG. 3 is an isometric view of a housing body of the transmission gearbox of FIG. 2 mounting the example baffle.

Referring also to FIG. 3, the transmission 38 includes an output shaft assembly 50 including an output gear 52 that rotates about a gear axis 54 and includes first and second faces 56a, 56b at axial ends thereof and defines an outer periphery 58 where teeth are formed. The output shaft assembly 50 is mounted at a first inner boss 60 of the first housing body 44 and a second inner boss 62 of the second housing body 46. Various additional shafts 64 and gears 66, a subset of which are illustrated in FIGS. 2 and 3, are rotationally supported in gear mounts 68 including an input gear mount 70. Several (e.g., seven) gears are provided in the illustrated example, including a second gear 72 that rotates about a second gear axis 74 and meshes with the output gear 52. The additional gears 66 are mechanically linked between the output gear 52 and an input gear (not shown), with the rotation of the shafts 64 and the gears 66 facilitated by several rolling element bearings (not shown). The rotational components of the work equipment transmission 38 may be arranged into a number of stages, with the output shaft assembly 50 serving as a seventh stage gearing output in the illustrated example and the second gear 72 serving as a sixth stage of gearing. In further embodiments, various other gear train configurations are possible. The output shaft assembly 50 has a first end 76 and a second end 78, both of which project through the respective first and second housing body 44, 46 for selective mechanical connection (e.g., via splined shafts) to a corresponding rotatable component from the exterior of the gearbox housing 42, to selectively drive the rotatable component. Additionally, rolling element bearings 80 (e.g., roller bearings, tapered roller bearings, etc.) are disposed around the output shaft 48 to facilitate rotation of the output gear 52 and elements of the output shaft assembly 50 about the gear axis 54. Similarly, the additional shafts 64 are supported by multiple bearings (not shown) to facilitate the rotation of the additional shafts 64 and the supported additional gears 66.

The first and second housing bodies 44, 46 form an internal cavity that defines a sump 82 that is a fluid-tight chamber or compartment that retains a volume of lubricant (e.g., oil, transmission fluid, and the like) in a lower portion of the gearbox housing 42. The sump 82 is defined within a lower portion of an internal cavity 84 provided within the first housing body 44 and the second housing body 46. When assembled, the housing bodies 44, 46 abut to form a fluid-tight seal enabling the sump 82 to retain a body of lubricant or "lubricant reservoir." Any number and type of gaskets or other sealing elements may be disposed between the housing bodies 44, 46 to minimize, if not eliminate leakage at this interface. Following assembly of the gearbox housing 42, a selected lubricant is injected into the interior of the gearbox housing 42 and collects within the sump 82 to form the lubricant reservoir. The volume of lubricant introduced into the transmission gearbox housing 42 will vary; however, by way of example, dashed line 86 in FIG. 2 may represent a fill line of the gearbox housing 42 and, therefore, may correspond to an upper surface of the lubricant reservoir held within the sump 82 when filled with a selected lubricant. The dashed line 86 is only a general representation of the location of the upper surface of the lubricant reservoir, noting that the volume of the lubricant reservoir (and thus the location of the upper surface) will vary depending upon the volume of lubricant held within the gearbox housing 42 at a given point in time and the operational status of the transmission. In particular, the fill line may be proximate or collinear with the gear axis 54.

As shown, the dashed line 86 indicating the volume of the lubricant reservoir may partially overlap with the output gear 52. However, it is desirable to avoid immersion of the output gear 52 in the lubricant reservoir for various reasons, such as preventing transmission windage power loss. Therefore, the baffle 40 is mounted with the output shaft assembly 50 to separate the lubricant reservoir from the output gear 52. The baffle 40 is also closely fit around the output gear 52 to protect the output gear 52 and prevent drag on gear teeth from the bulk volume of the lubricant.

Figure 4:
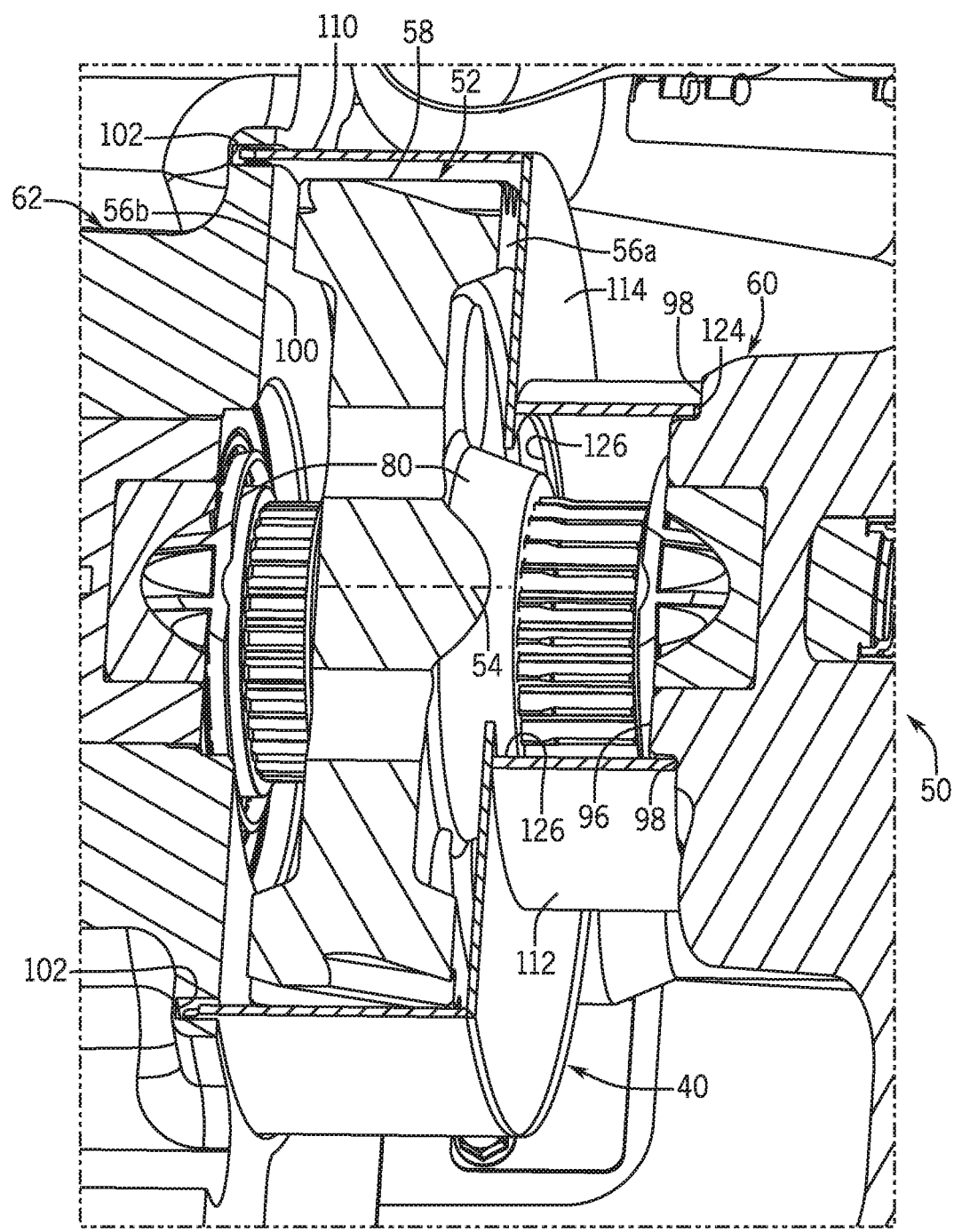
FIG. 4 is a partial cross-sectional view of the transmission gearbox of FIG. 2 and the example baffle, as taken along line 4-4 of FIG. 2.

Referring also to FIGS. 4 and 5, the first inner boss 60 of the first housing body 44 and the second inner boss 62 of the second housing body 46 are arranged to receive the output shaft assembly 50 and arranged to positively mount the baffle 40 with a clamping force applied by various structures that are complementary to features of the baffle 40. The first and second inner bosses 60, 62 may also slightly axially compress the baffle 40 under a clamping force to provide a tight fit, for example compressing the baffle 40 by up to about 3 mm. In particular, the first inner boss 60 has a first outlet opening 92 for receiving the output shaft assembly 50 and the second inner boss 62 has a corresponding second outlet opening 94. In this manner, the first and second outlet openings 92, 94 each define the gear axis 54 and allow the output shaft 48 to extend to the exterior of the gearbox housing 42. For mounting the baffle 40, the first inner boss 60 has a first inner face 96 having a first baffle-retaining surface 98 and the second inner boss 62 has a second inner face 100 having a second baffle-retaining surface 102. In the illustrated example, the first and second inner faces 96, 100 are substantially parallel to each other and are substantially perpendicular to the gear axis 54 of the output gear 52. The second baffle-retaining surface 102 in this example is an annular groove having a radially inner wall 104 and a radially outer wall 106 that are spaced apart. This second baffle-retaining surface 102 further includes an anti-rotation surface 108 formed between the radially inner wall 104 and the radially outer wall 106. The anti-rotation surface 108 of the illustrated example is a slot, although other arrangements are contemplated.

Referring also to FIG. 6, the example baffle 40 will be described in greater detail. The baffle 40 principally includes a shroud wall 110 and an annular collar 112 that are substantially cylindrical and concentric with the annular collar 112 having a relatively smaller diameter than the shroud wall. An end wall 114 is a disc shape that extends radially to unite the shroud wall 110 with the annular collar 112. The end wall 114 extends from the circumferential shroud wall 110 in a radially inward direction. The annular collar 112 projects from the annular end wall 114 in a rearward axial direction opposite the shroud wall 110. The shroud wall 110 defines a peripheral lip 116 at a terminal side opposite the end wall 114 and having at least one tab 118 extending axially therefrom for insertion into the anti-rotation surface 108. Although two tabs 118 and two corresponding anti-rotation surfaces 108 are illustrated, other examples of the disclosed gearbox housing 42 may implement one, three, four, five, six, or more tabs and corresponding anti-rotation surfaces. The terms "radial" and "axial," as appearing herein in reference to parts of the baffle 40, are relative to the centerline of the baffle 40, which when assembled corresponds to the gear axis 54.

The shroud wall 110 extends around less than 360 degrees to define a gear-mesh window 120. The example shroud wall 110 extends greater than 270 degrees to protect and isolate the output gear 52; in other words, the gear-mesh window 120 occupies less than 90 degrees of the shroud wall 110. This extent of the shroud wall 110 may vary so long as the output gear 52 sufficiently meshes with the second gear 72. The example annular collar 112 does extend around 360 degrees as a fully enclosed annular part, although in other embodiments the annular collar 112 may also form a window similar to the gear-mesh window 120 in the shroud wall 110. Any number of peripheral gear-mesh windows 120 or similar openings may be formed in the baffle 40 to, for example, permit the engagement of the additional gear(s) 66 external to the baffle 40 with the output gear 52 or gear(s) enclosed by baffle 40.

A stiffening rib 122 is optionally provided on the end wall 114 to strengthen the baffle 40 and mitigate vibration. The stiffening rib 122 is positioned within the extent of the gear-mesh window 120 and extends at least partly in an axial direction away from the peripheral lip 116, such that when assembled the stiffening rib 122 does not engage any other structure of the transmission 38 or the gearbox housing 42. The annular collar 112 terminates opposite the end wall 114 at an annular collar lip 124 is concentric with the annular collar lip 124. A central opening 126 is formed in the end wall 114 and connects the main interior compartment or cylindrical cavity of the baffle 40 (that is, the interior portion of the baffle 40 circumscribed by the shroud wall 110) with the smaller interior compartment of the baffle 40 (that is, the interior portion of baffle 40 circumscribed by the annular collar 112). When the baffle 40 is installed within the gearbox housing 42, a portion of the output shaft assembly 50 extends through the central opening 126, as well as through the open forward and aft ends of the baffle 40. The annular collar lip 124 is sized to fit closely with the first inner boss 60 of the first housing body 44 and may be configured with relatively greater material strength to withstand operating loads at and assembly clamping loads at the interface with the first inner boss 60.

In various embodiments, a substantial portion, if not the entirety of the baffle 40 may be integrally formed as a unitary part (e.g., formed from the same material at the same time by the same process). Likewise, the tabs 118 may a unitary part with the shroud wall 110 and the stiffening rib 122 may be a unitary part with the end wall 114. In certain examples, one or more of the shroud wall 110, the annular collar 112, and the end wall 114 may be separately formed parts assembled together. To aid in mounting with a clamping force, the baffle 40 may have a slight degree of flexibility or resiliency in its construction material (e.g., sheet metal or polymeric material) and/or flexibility at its corners (corner of the shroud wall 110 meeting the end wall 114 and/or the corner of the annular collar 112 meeting the end wall 114). The annular collar lip 124 in the illustrated example is a separate part (e.g., a sheet metal circular part) that is welded onto the annular collar 112. Additional sealing features (e.g., O-rings) may be added for assembly at the peripheral lip 116 or the annular collar lip 124 (or the corresponding first and second baffle-retaining surfaces 98, 102).

When the work equipment transmission 38 is fully assembled, the baffle 40 is fit closely (e.g., under compressive clamping force) between the first inner boss 60 of the first housing body 44 and the second inner boss 62 of the second housing body 46 so as to apply a clamping force sufficient to retain the baffle 40 in place without separate fasteners or the like. The annular collar lip 124 engages the first baffle-retaining surface 98. As shown in FIG. 4, the annular collar lip 124 slides over a complementarily shaped circular waist 130 of the first inner boss 60 to press against the first baffle-retaining surface 98. At the opposite axial end of the baffle 40, the peripheral lip 116 of the shroud wall 110 engages with the second baffle-retaining surface 102 by fitting between the radially inner and outer walls 104, 106. The baffle may be clamped and compressed between the first and second baffle-retaining surfaces 98, 102 due to having an unloaded axial length that is equal to or greater than the distance between the first and second inner bosses 60, 62. In certain examples, the baffle 40 may have an axial length that is about 0-6 mm greater or about 0-3 mm greater than the distance between the first and second baffle-retaining surfaces 98, 102. The gearbox housing 42 is filled with a volume of lubricant as indicated by the fill line 86, which as noted above may vary. The baffle 40 extends at least partially around the outer periphery 58 of the output gear 52, isolating the output gear 52 from the lubricant reservoir in the sump 82. The output gear 52 enclosed by the baffle 40 is engaged, through the gear-mesh window 120, by the second gear 72 within the gearbox housing 42. In this manner, the output gear 52 and the output shaft assembly 50 are substantially isolated from the lubricant reservoir in the sump 82.

The annular collar 112 may further help maintain part spacing and prevent undesired contact or rubbing between rotating and static components within the gearbox housing 42. Additionally, as noted above, a clearance or buffer is provided between the first face 56a of the enclosed output gear 52 and the end wall 114. A lower portion of the annular end wall 114 may also serve as a dam feature or retention wall preventing the lower interior of the baffle 40 (defined by a portion of the shroud wall 110 located within the lubricant reservoir) from filling with a pool of lubricant. This, along with relatively tight dimensioning of the baffle 40 relative to the enclosed output gear 52, may reduce eliminating windage of the output gear 52 during operation of the work equipment transmission 38.

To assemble the work equipment transmission 38, some or all of the internal components may be first mounted to either the first housing body 44 or the second housing body 46 before the first and second housing bodies 44, 46 are subsequently connected together. An example method of assembly includes providing the first housing body 44 including the first baffle-retaining surface 98 on the first inner boss 60 and the first outlet opening 92. The output gear 52 is mounted in the first housing body 44, the output gear 52 having the first face 56a and the outer periphery 58 and is rotatable about the gear axis 54 defined by the first outlet opening 92. The output gear 52 is mounted on the output shaft 48 along with some or all of the components of the output shaft assembly 50 such as the rolling element bearings 80. The additional shafts 64 and gears 66, including the second gear 72, are assembled at their respective gear mounts 68 including an input shaft and an input gear at the input gear mount 70. The baffle 40 is installed on the output gear 52, the baffle 40 having the shroud wall 110 defining the peripheral lip 116, the annular collar 112 having the annular collar lip 124 and having the opening 126 concentric with the annular collar lip 124, and an end wall 114 extending radially and uniting the shroud wall 110 and the annular collar 121. The second housing body 46 having the second baffle-retaining surface 102 mounts to the first hosing body 44. Subsequently, the first housing body 44 is mated to the second housing body 46, for example by bolts, to form the gearbox housing 42 containing the output gear 52 within the internal cavity 84 that defines the sump 82 retaining a volume of lubricant. The baffle 40 is installed within the gear housing 42 to separate the output gear 52 from the volume of lubricant in the sump 82, the end wall 114 extending proximate the first face 56a of the output gear 52, and the shroud wall 110 extending at least partially around the outer periphery 58 of the output gear 52. The baffle is also disposed within the gear housing 42 to with the opening 126 disposed about the gear axis 54 by a clamping force between the first hosing body 44 and the second housing body 46 and engagement of the peripheral lip 116 with the first baffle-retaining surface 98 of the first housing body 44 and engagement of the collar lip 124 with the second baffle-retaining surface 102 of the second housing body 102. In this manner, the baffle 40 is clamped between the first inner boss 60 of the first housing body and the second inner boss 62 of the second housing body 46.

In addition, the method of assembly may include one or more of the following steps and structural details. The second housing body 46 has at least one anti-rotation surface 102 and the baffle 40 has at least one tab 118 sized to engage the at least one anti-rotation surface 102 of the second housing body 46. The second housing body 46 has multiple anti-rotation surfaces 108 in the form of slots; and the baffle 40 has multiple tabs 118 extending from the shroud wall 110 and configured to engage the slots 108 in the second housing body 46. The collar lip 124 is substantially circular. The second baffle-retaining surface 102 is an annual groove having a radially inner wall 104 and a radially outer wall 106 spaced apart to receive the peripheral lip 161 of the shroud wall 110 of the baffle 40. The baffle 40 has at least one tab 118 extending axially from the shroud wall 110; At least one slot 108 is formed between the radially inner wall 104 and the radially outer wall 106 sized and positioned to receive the at least one tab 118. The shroud wall 110 extends less than 360 degrees about the gear axis 54 to define a gear-mesh window 210. The end wall 114 defines a stiffening rib 122 extending, at least in part, in an axial direction away from the peripheral lip 116 of the shroud wall 110. The method of assembly may further include mounting a second gear 72 in the gearbox housing 42 for rotation about a second gear axis 74 parallel with the gear axis 54, wherein the second gear 72 meshes with the output gear 52 through the gear-mesh window 120 of the baffle 40. The annular collar 112 is welded to the end wall 114 of the baffle 40.

Embodiments of the baffle may include additional manifestations of the disclosed features or rearrangements thereof. In alternative examples, anti-rotation structures such as tabs may be provided on the annular collar in addition to or in lieu of the shroud wall. Although the disclosed baffle is described as mounted to the output gear, the baffle is applicable to any or all of the gears of a work equipment transmission. Accordingly, the disclosed baffle may be of any size to closely fit with the intended gear(s), and one or more gear-mesh windows may be provided in the shroud wall and/or annular collar as necessary to allow for mated gear engagement.

Enumerated Examples of a Work Equipment Transmission with Gear Baffle and Method of Assembly Also, the following examples are provided, which are numbered for ease of reference.

1. A work equipment (e.g., vehicle) transmission is provided. In various embodiments, the work equipment transmission comprises a gear having a face and an outer periphery and rotatable about a gear axis; a gearbox housing containing the gear within an internal cavity that defines a sump retaining a volume of lubricant, the gearbox housing defined by: a first housing body having a first baffle-retaining surface and an outlet opening disposed about the gear axis; and a second housing body mountable to the first housing body and having a second baffle-retaining surface; and a baffle having: a shroud wall defining a peripheral lip; an annular collar having an annular collar lip, the annular collar having an opening concentric with the annular collar lip; an end wall extending radially and uniting the shroud wall and the annular collar; and wherein the baffle is disposed within the gearbox housing to separate the gear from the volume of lubricant in the sump, the end wall extending proximate the face of the gear and the shroud wall extending at least partially around the outer periphery of the gear; and wherein the baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

2. The work equipment transmission of example 1, wherein the second housing body has at least one anti-rotation surface; wherein the baffle has at least one tab; and wherein the at least one tab is sized to engage the at least one anti-rotation surface of the second housing body.

3. The work equipment transmission of example 2, wherein the second housing body has multiple anti-rotation surfaces in the form of slots; and wherein the baffle has multiple tabs extending from the shroud wall and configured to engage the slots in the second housing body.

4. The work equipment transmission of example 1, wherein the second baffle-retaining surface is an annual groove having a radially inner wall and a radially outer wall spaced apart to receive the peripheral lip of the shroud wall of the baffle.

5. The work equipment transmission of example 4, wherein the baffle has at least one tab extending axially from the shroud wall; and wherein at least one slot is formed between the radially inner wall and the radially outer wall sized and positioned to receive the at least one tab.

6. The work equipment transmission of example 1, wherein the shroud wall extends less than 360 degrees about the gear axis to define a gear-mesh window.

7. The work equipment transmission of example 6, wherein the end wall defines a stiffening rib extending, at least in part, in an axial direction away from the peripheral lip of the shroud wall.

8. The work equipment transmission of example 6, further comprising a second gear mounted in the gearbox housing for rotation about a second gear axis parallel with the gear axis; wherein the second gear meshes with the gear through the gear-mesh window of the baffle.

9. In other examples, a method of assembling a work equipment transmission with a baffle is provided. The method comprises providing a first housing body having a first baffle-retaining surface and an outlet opening; mounting a gear in the first housing body, the gear having a face and an outer periphery and rotatable about a gear axis defined by the outlet opening; installing a baffle on the gear, the baffle having: a shroud wall defining a peripheral lip; an annular collar having an annular collar lip, the annular collar having an opening concentric with the annular collar lip; an end wall extending radially and uniting the shroud wall and the annular collar; mounting a second housing body to the first housing body, the second housing body having a second baffle-retaining surface; and mating the first housing body with the second housing body to form a gearbox housing containing the gear within an internal cavity that defines a sump retaining a volume of lubricant; wherein the baffle is disposed within the gearbox housing to separate the gear from the volume of lubricant in the sump, the end wall extending proximate the face of the gear and the shroud wall extending at least partially around the outer periphery of the gear; and wherein the baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

10. The method of example 9, wherein the second housing body has at least one anti-rotation surface; wherein the baffle has at least one tab; and wherein the at least one tab is sized to engage the at least one anti-rotation surface of the second housing body.

11. The method of example 10, wherein the second housing body has multiple anti-rotation surfaces in the form of slots; and wherein the baffle has multiple tabs extending from the shroud wall and configured to engage the slots in the second housing body.

12. The method of example 9, wherein the second baffle-retaining surface is an annual groove having a radially inner wall and a radially outer wall spaced apart to receive the peripheral lip of the shroud wall of the baffle.

13. The method of example 12, wherein the baffle has at least one tab extending axially from the shroud wall; and wherein at least one slot is formed between the radially inner wall and the radially outer wall sized and positioned to receive the at least one tab.

14. The method of example 9, wherein the shroud wall extends less than 360 degrees about the gear axis to define a gear-mesh window.

15. The method of example 14, further comprising mounting a second gear in the gearbox housing for rotation about a second gear axis parallel with the gear axis; wherein the second gear meshes with the gear through the gear-mesh window of the baffle.

CONCLUSION

There has thus been described embodiments of work equipment (e.g., work vehicle) transmission gearboxes containing baffles, which provide several benefits and perform fundamental functions within the gearboxes. The disclosed baffle provides an elegant and robust design with reduced part counts and improved assembly, reducing various manufacturing costs while improving performance of a gearbox transmission. In particular, the disclosed baffle may reduce windage losses thus improving power efficiency, improves lubricant retention, protects the gear, maintains proper part spacing, and provides other desirable benefits.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work equipment transmission comprising:
a gear having a face and an outer periphery and rotatable about a gear axis;
a gearbox housing containing the gear within an internal cavity that defines a sump retaining a volume of lubricant, the gearbox housing defined by:
  a first housing body having a first baffle-retaining surface and an outlet opening disposed about the gear axis; and
  a second housing body mountable to the first housing body and having a second baffle-retaining surface; and
a baffle having:
  a shroud wall defining a peripheral lip;
  an annular collar having an annular collar lip, the annular collar having an opening concentric with the annular collar lip;
  an end wall extending radially and uniting the shroud wall and the annular collar; and
  wherein the baffle is disposed within the gearbox housing to separate the gear from the volume of lubricant in the sump, the end wall extending proximate the face of the gear and the shroud wall extending at least partially around the outer periphery of the gear; and
  wherein the baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

2. The work equipment transmission of claim 1, wherein the second housing body has at least one anti-rotation surface;
  wherein the baffle has at least one tab; and
  wherein the at least one tab is sized to engage the at least one anti-rotation surface of the second housing body.

3. The work equipment transmission of claim 2, wherein the second housing body has multiple anti-rotation surfaces in the form of slots; and
  wherein the baffle has multiple tabs extending from the shroud wall and configured to engage the slots in the second housing body.

4. The work equipment transmission of claim 1, wherein the collar lip is substantially circular.

5. The work equipment transmission of claim 1, wherein the second baffle-retaining surface is an annual groove having a radially inner wall and a radially outer wall spaced apart to receive the peripheral lip of the shroud wall of the baffle.

6. The work equipment transmission of claim 5, wherein the baffle has at least one tab extending axially from the shroud wall; and
  wherein at least one slot is formed between the radially inner wall and the radially outer wall sized and positioned to receive the at least one tab.

7. The work equipment transmission of claim 1, wherein the shroud wall extends less than 360 degrees about the gear axis to define a gear-mesh window.

8. The work equipment transmission of claim 7, wherein the end wall defines a stiffening rib extending, at least in part, in an axial direction away from the peripheral lip of the shroud wall.

9. The work equipment transmission of claim 7, further comprising a second gear mounted in the gearbox housing for rotation about a second gear axis parallel with the gear axis;
  wherein the second gear meshes with the gear through the gear-mesh window of the baffle.

10. The work equipment transmission of claim 1, wherein the annular collar is welded to the end wall of the baffle.

11. A method of assembling a work equipment transmission with a baffle, comprising:
  providing a first housing body having a first baffle-retaining surface and an outlet opening;
  mounting a gear in the first housing body, the gear having a face and an outer periphery and rotatable about a gear axis defined by the outlet opening;
  installing a baffle on the gear, the baffle having:
    a shroud wall defining a peripheral lip;
    an annular collar having an annular collar lip, the annular collar having an opening concentric with the annular collar lip;
    an end wall extending radially and uniting the shroud wall and the annular collar;
  mounting a second housing body to the first housing body, the second housing body having a second baffle-retaining surface; and
  mating the first housing body with the second housing body to form a gearbox housing containing the gear within an internal cavity that defines a sump retaining a volume of lubricant;
  wherein the baffle is disposed within the gearbox housing to separate the gear from the volume of lubricant in the sump, the end wall extending proximate the face of the gear and the shroud wall extending at least partially around the outer periphery of the gear; and
  wherein the baffle is mounted to the gearbox housing with the opening disposed about the gear axis by a clamping force between the first housing body and the second housing body and engagement of the peripheral lip with the first baffle-retaining surface of the first housing body and engagement of the collar lip with the second baffle-retaining surface of the second housing body.

12. The method of claim 11, wherein the second housing body has at least one anti-rotation surface;
  wherein the baffle has at least one tab; and
  wherein the at least one tab is sized to engage the at least one anti-rotation surface of the second housing body.

13. The method of claim 12, wherein the second housing body has multiple anti-rotation surfaces in the form of slots; and
  wherein the baffle has multiple tabs extending from the shroud wall and configured to engage the slots in the second housing body.

14. The method of claim 11, wherein the collar lip is substantially circular.

15. The method of claim 11, wherein the second baffle-retaining surface is an annual groove having a radially inner wall and a radially outer wall spaced apart to receive the peripheral lip of the shroud wall of the baffle.

16. The method of claim 15, wherein the baffle has at least one tab extending axially from the shroud wall; and wherein at least one slot is formed between the radially inner wall and the radially outer wall sized and positioned to receive the at least one tab.

17. The method of claim 11, wherein the shroud wall extends less than 360 degrees about the gear axis to define a gear-mesh window.

18. The method of claim 17, wherein the end wall defines a stiffening rib extending, at least in part, in an axial direction away from the peripheral lip of the shroud wall.

19. The method of claim 17, further comprising mounting a second gear in the gearbox housing for rotation about a second gear axis parallel with the gear axis;

wherein the second gear meshes with the gear through the gear-mesh window of the baffle.

20. The method of claim 11, wherein the annular collar is welded to the end wall of the baffle.

* * * * *